United States Patent
Moens et al.

(10) Patent No.: US 6,384,102 B1
(45) Date of Patent: May 7, 2002

(54) POWDER COMPOSITIONS WITH SEMI-CRYSTALLINE POLYESTER AND ACRYLIC COPOLYMER BASE CONTAINING ETHYLENICALLY UNSATURATED GROUPS

(75) Inventors: Luc Moens, Sint-Genesius-Rode; Jean-Marie Loutz; Daniel Maetens, both of Brussels; Patrick Loosen, Ruisbrooek; Marc Van Kerckhove, Nil-Saint-Vincent, all of (BE)

(73) Assignee: UCB S.A., Brussels (BE)

( * ) Notice: Subject to any disclaimer, the term of this patent is extended or adjusted under 35 U.S.C. 154(b) by 0 days.

(21) Appl. No.: 09/284,880

(22) PCT Filed: Oct. 24, 1997

(86) PCT No.: PCT/BE97/00125

§ 371 Date: Apr. 21, 2000

§ 102(e) Date: Apr. 21, 2000

(87) PCT Pub. No.: WO98/18874

PCT Pub. Date: May 7, 1998

(30) Foreign Application Priority Data

Oct. 25, 1996 (BE) ............................................ 09600906

(51) Int. Cl.[7] .................................................. C08F 2/46
(52) U.S. Cl. .................. 522/110; 522/109; 522/11; 522/112; 522/104; 522/107; 522/150; 522/153; 522/154; 525/28; 525/32.1; 525/32.2; 525/36; 427/508; 427/512; 428/480; 428/482; 428/500
(58) Field of Search ................... 522/104, 109, 522/110, 111, 112, 107, 150, 153, 154; 525/28, 32.1, 32.2, 36; 427/508, 512, 27; 428/480, 482, 500

(56) References Cited

U.S. PATENT DOCUMENTS

| | | | | |
|---|---|---|---|---|
| 3,974,303 A | * | 8/1976 | Iwase et al. | 427/27 |
| 4,753,817 A | * | 6/1988 | Meixner et al. | 427/54.1 |
| 4,937,288 A | * | 6/1990 | Pettit, Jr. et al. | 525/176 |
| 5,397,641 A | * | 3/1995 | Moens et al. | 428/357 |
| 5,625,028 A | | 4/1997 | Barbee et al. | 528/272 |

FOREIGN PATENT DOCUMENTS

| | | |
|---|---|---|
| WO | WO 93/25596 | 12/1993 |
| WO | WO 96/00751 | 1/1996 |

OTHER PUBLICATIONS

"Styrene–Free, Low–Emission, Unsaturated Polyester Resins", German Abstract, Derwent's Nov. 1994, EP 624.609 BASF AG.

Styrene–Free, Low–Emission, Unsaturated Polyester Resins, Dale Gerth et al., EP 624,609, 37—Plastics Manuf., vol. 123, 1995, p. 10903.

* cited by examiner

Primary Examiner—James J. Seidleck
Assistant Examiner—Sanza L. McClendon
(74) Attorney, Agent, or Firm—Finnegan, Henderson, Farabow, Garrett & Dunner, L.L.P.

(57) ABSTRACT

Radiation-curable powder compositions, usable as paint or varnish, which comprise a mixture of at least one semi-crystalline polyester containing end methacryloyl groups and of at least one acrylic copolymer containing ethylenically unsaturated groups, these polyesters comprising the reaction products of a glycidyl methacrylate and of a semi-crystalline polyester containing end carboxyl groups.

38 Claims, No Drawings ns with SEMI-
CRYSTALLINE POLYESTER AND ACRYLIC
COPOLYMER BASE CONTAINING
ETHYLENICALLY UNSATURATED GROUPS

DESCRIPTION

The present invention relates to novel radiation-curable powder compositions comprising a mixture of at least one semi-crystalline polyester containing end methacryloyl groups and of at least one acrylic copolymer containing ethylenically unsaturated groups, as well as to the preparation and to the uses of the said compositions.

More particularly, the -present invention relates to powder compositions curable by ultraviolet irradiation or by accelerated electron beams, the binder of which is composed of a mixture of at least one semi-crystalline polyester containing end methacryloyl groups and of at least one acrylic copolymer containing ethylenically unsaturated groups, and preferably acryloyl or methacryloyl groups, and which lend themselves to the production of paint and varnish coatings exhibiting a unique array of properties, inter alia excellent hardness and flexibility, notable resistance to solvents and at the same time good stability on storage.

Heat-curable powder compositions are well known in the state of the art and are widely used as paints and varnishes for coating the most diverse objects. The advantages of these powders are manifold; on the one hand, problems due to solvents are completely eliminated and, on the other hand, the powders are 100% used, insofar as only the powder in direct contact with the substrate is retained by the latter, the excess powder being, in principle, fully recoverable and reusable. This is why these powder compositions are preferred with respect to coating compositions which are provided in the form of solutions in an organic solvent.

Heat-curable powder compositions have already found a wide outlet in the coating of domestic electrical appliances, automobile industry accessories, metal furniture, and the like. They generally contain heat-curable organic compounds which constitute the binder for the paint, fillers, pigments, catalysts and various additives for adapting their behaviour to their use.

Different types of heat-curable powder compositions exist. The- most well known compositions contain, as binder, polyesters containing carboxyl groups or hydroxyl groups, acrylic copolymers carrying glycidyl, carboxyl or hydroxyl groups, and the like, as a mixture with crosslinking agents containing functional groups capable of reacting with the functional groups of the abovementioned polymers.

The acrylic copolymers containing glycidyl, carboxyl or hydroxyl groups used in heat-curable powder compositions are typically composed of alkyl acrylates and methacrylates, of vinyl or allyl monomers, of acrylamides, of acrylic or methacrylic acids, or of hydroxyalkyl or glycidyl acrylates and methacrylates. These acrylic copolymers exhibit glass transition temperatures of the order of 45 to 85° C.; it is necessary to use acrylic copolymers having such glass transition temperatures because, at lower temperatures, the compositions are unstable and reagglomerate during storage.

The viscosity at melting of the acrylic copolymers is also high, of the order of 10 to 10,000 mPa·s at 200° C. (cone/plate method). This high viscosity of the acrylic copolymers causes a series of problems. This is because, during the melting of the compositions which contain them, for the preparation of coatings, the flow of the coating is slowed down by the high value of the viscosity.

Finally, another problem lies in the stoving temperature of the heat-curable compositions containing acrylic copolymers carrying glycidyl, carboxyl or hydroxyl groups. In fact, even on carefully choosing the crosslinking agent and an appropriate catalyst for the reaction between the functional group of the acrylic copolymer and that of the crosslinking agent, it is never recommended to carry out the stoving of such compositions at temperature below 140° C., for a time of at least 10 minutes. If lower stoving temperatures are applied, the coatings obtained generally exhibit a poor surface appearance. It would therefore be desirable to find a means of lowering this temperature and this stoving time.

Moreover, even under ideal conditions, the coatings obtained from heat-curable compositions containing acrylic copolymers always exhibit a lack of flexibility and of impact resistance.

Provision has more recently been made, in order to solve the problems of flexibility and of impact resistance, for the addition of a semi-crystalline polyester containing carboxyl groups or hydroxyl groups to the heat-curable powder compositions involved here, as described in Patent Application WO 94/01505.

However, in spite of their advantageous properties, the semi-crystalline polyesters of the state of the art also exhibit significant disadvantages on an industrial scale, even if these semi-crystalline polyesters are used as an additional component for modifying commercially available conventional acrylic copolymers or polyesters.

In fact, the coatings obtained from such compositions containing semi-crystalline polyesters exhibit a reduced surface hardness (HB pencil hardness).

Moreover, in order to be curable at a moderate temperature, generally at least 140° C., acrylic copolymers require the presence of a crosslinking agent and of a catalyst. Now, for the preparation of the powder, the acrylic copolymer must be melted with the crosslinking agent, the catalyst and the other additives in an extruder at a temperature in the region of the crosslinking temperature of, the system. It follows that, without specific precautions, an undesirable premature crosslinking of the binder, by reaction between the acrylic copolymer and the crosslinking agent, already takes place during the preparation of the powder. This premature crosslinking of the binder can, without specific precautions, cause blocking of the extruder, which presents a not insignificant real danger. A powder thus prepared produces defective coatings because of the presence of gelled particles. Moreover, at the time when the molten film has to be spread over the substrate to be coated, the presence of an excessively large amount of crosslinking catalyst causes premature crosslinking, which brings about a rapid rise in the viscosity of the coating. This rise in the viscosity prevents good spreading, which results in malformations of the coating obtained, such as orange peel and the like.

In order to overcome these disadvantages, and with the aim of further lowering the stoving temperature and time for curable powder compositions containing acrylic copolymers, attempts have recently been made to use compositions curable by ultraviolet radiation or by electron beams. With this aim, use has been made of unsaturated acrylic copolymers, for example. Thus, in Patent Application WO 93/25596, good spreading of the coating and coatings having good flexibility have been obtained, by virtue of a low viscosity and of a low glass transition temperature, the powder being melted between 100 and 150° C. for a time of 10 to 30 minutes. However, this low glass transition temperature is the cause of a lack of stability on storage and of reagglomeration of the powder after a prolonged storage time at 40° C.

Consequently, it would be highly desirable to be able to have available novel binders for the manufacture of powder compositions which can be cured by ultraviolet irradiation or by accelerated electron beams and which no longer exhibit the disadvantages recalled above, due to the fact that the mechanism of crosslinking is no longer concomitant with that of melting of the powder. Such binders should make it possible to prepare powder compositions which can be cured at low temperatures, for example 100 to 150° C., and which can be rapidly melted, as during short periods of 1 to 5 minutes, before irradiation. In addition, these compositions should both exhibit good stability on storage and ensure production of paint or varnish coatings possessing excellent physical properties, in particular as regards the fluidity in the molten state, the surface appearance, the surface hardness, the flexibility and the resistance to solvents.

The surprising discovery has now been made that this objective is achieved when, for the preparation of powder compositions curable by UV radiation or accelerated electron beams, use is made, as binder, of a mixture of semi-crystalline polyesters containing end methacryloyl groups and of acrylic copolymers containing ethylenically unsaturated groups, preferably acryloyl or methacryloyl groups. The polyesters are prepared from a glycidyl methacrylate and from semi-crystalline polyesters, themselves prepared from specific acid and alcohol constituents.

The subject of the present invention is therefore novel powder compositions curable by UV radiation or accelerated electron beams comprising a mixture of at least one semi-crystalline polyester containing end methacryloyl groups and of at least one acrylic copolymer containing ethylenically unsaturated groups, these polyesters comprising the reaction products of a glycidyl methacrylate and of a semi-crystalline polyester containing end carboxyl groups, the latter being chosen from (a) a polyester which is the reaction product of
  (1) an acid constituent which contains (a.1.1) 85 to 100 mol % of terephthalic acid, of 1,4-cyclohexanedicarboxylic acid or of 1,12-dodecanedioic acid and (a.1.2) 0 to 15 mol % of at least one other aliphatic, cycloaliphatic or aromatic di- or polycarboxylic acid having from 4 to 14 carbon atoms; with,
  (2) an alcohol constituent which contains (a.2.1) 85 to 100 mol % of a saturated, straight-chain, aliphatic diol having from 2 to 12 carbon atoms and (a.2.2) 0 to 15 mol % of at least one other aliphatic or cycloaliphatic di- or polyol having from 2 to 15 carbon atoms;
and
(b) a polyester which is the reaction product of
  (1) an acid constituent which contains (b.1.1) 85 to 100 mol % of a saturated, straight-chain, aliphatic dicarboxylic acid having from 4 to 14 carbon atoms and (b.1.2) 0 to 15 mol % of at least one other aliphatic, cycloaliphatic or aromatic di- or polycarboxylic acid having from 4 to 14 carbon atoms; with,
  (2) an alcohol constituent which contains (b.2.1) 85 to 100 mol % of 1,4-cyclo-hexanediol or of 1,4-cyclohexane-dimethanol and (b.2.2) 0 to 15 mol % of at least one other aliphatic or cycloaliphatic di- or polyol having from 2 to 15 carbon atoms;
and the said acrylic copolymer containing ethylenically unsaturated groups being composed of the
(c) reaction product of
  (1) an acrylic copolymer carrying functional groups containing (c.1.1) 40 to 95 mol % of at least one monomer containing the acryloyl or methacryloyl group, (c.1.2) 5 to 60 mol % of at least one other ethylenically unsaturated monomer and (c.1.3) 5 to 60 mol %, calculated with respect to the total of the amounts of (c.1.1) and (c.1.2), of another ethylenically unsaturated monomer carrying a functional group capable of undergoing an addition or condensation reaction and chosen from the epoxy, carboxyl, hydroxyl or isocyanato groups, with
  (2) a monomer (c.2) containing an ethylenically unsaturated group and a functional group capable of undergoing an addition or condensation reaction with the functional group of the monomer (c.1.3) incorporated in the acrylic copolymer (1).

The semi-crystalline polyesters containing end methacryloyl groups incorporated in the compositions in accordance with the present invention most often exhibit a degree of end unsaturation of 0.17 to 2.0, preferably of 0.35 to 1.50, milliequivalents of double bonds per gram of polyester.

In addition, these semi-crystalline polyesters containing end methacryloyl groups preferably exhibit the following characteristics:

a number-average molecular weight of between 1000 and 20,000, preferably between 1400 and 8500, measured by gel permeation chromatography (or GPC), a well-defined melting point of 60 to 150° C., determined by differential scanning calorimetry (or DSC) according to ASTM standard D 3418-82, a viscosity of less than or equal to 10,000 mPa·s at 175° C., measured by the cone/plate method (ICI viscosity) according to ASTM standard D 4287-88.

The acid constituent of the semi-crystalline polyester (a) containing end carboxyl groups contains 85 to 100 mol % of terephthalic acid, of 1,4-cyclo-hexanedicarboxylic acid or of 1,12-dodecanedioic acid and optionally up to 15mol % of one or more other aliphatic, cycloaliphatic or aromatic di- or poly-carboxylic acids having from 4 to 14 carbon atoms, such as maleic acid, fumaric acid, isophthalic acid, phthalic acid, terephthalic acid, 1,2-cyclohexane-dicarboxylic acid, 1,3-cyclohexanedicarboxylic acid, 1,4-cyclohexanedicarboxylic acid, succinic acid, glutaric acid, adipic acid, pimelic acid, suberic acid, azelaic acid and sebacic acid. These acids can be used in the form of the free acid or of their functional derivatives, in particular in the form of the anhydride. The use of a polycarboxylic acid (or its anhydride) containing at least three carboxyl groups, for example trimellitic acid (or the anhydride) or pyromellitic acid, makes possible the preparation of branched polyesters. In addition, these di- or poly-carboxylic acids can be used alone or as a mixture but they are preferably used alone.

The alcohol constituent of the semi-crystalline polyester (a) containing end carboxyl groups contains 85 to 100 mol % of a saturated, straight-chain, aliphatic diol having from 2 to 12 carbon atoms. Examples of diols which can be used are ethylene glycol, 1,4-butanediol, 1,5-pentanediol and 1,6-hexanediol. The alcohol constituent of the semi-crystalline polyester (a) containing end carboxyl groups can also contain up to 15 mol % of one or more other aliphatic or cycloaliphatic di- or polyols having from 2 to 15 carbon atoms, such as, for example, 1,4-cyclohexanediol, 1,4-cyclohexanedimethanol or hydrogenated bisphenol A. For the preparation of branched polyesters, use is advantageously made of trihydroxylated or tetrahydroxylated polyols, such as trimethylolpropane, ditrimethylolpropane, trimethylol-ethane or pentaerythritol and their mixtures.

The acid constituent of the semi-crystalline polyester (b) containing end carboxyl groups contains 85 to 100 mol % of a saturated, straight-chain, aliphatic dicarboxylic acid having from 4 to 14 carbon atoms. Examples of the acids which can be used are succinic acid, glutaric acid, adipic acid, pimelic acid, suberic acid, azelaic acid, sebacic acid, 1,12-dodecanedioic acid, and the like. These acids can be used in the form of free acids or of their functional derivatives, in particular in the form of anhydrides. In addition, these acids can be used alone or as a mixture but they are preferably used alone.

The acid constituent of the semi-crystalline polyester (b) containing end carboxyl groups can also contain up to 15 mol % of one or more other aliphatic, cycloaliphatic or aromatic di- or polycarboxylic acids having from 4 to 14 carbon atoms, such as maleic acid, fumaric acid, terephthalic acid, phthalic acid, isophthalic acid, 1,2-cyclohexanedicarboxylic acid, 1,3-cyclohexanedicarboxylic acid or 1,4-cyclohexane-dicarboxylic acid. The use of a polycarboxylic acid (or its anhydride) containing at least three carboxyl groups, for example trimellitic acid (or the anhydride) or pyromellitic acid, makes possible the preparation of branched polyesters. In addition, these di- or polycarboxylic acids can be used alone or as a mixture but they are preferably used alone.

The alcohol constituent of the semi-crystalline polyester (b) containing end carboxyl groups contains 85 to 100 mol % of 1,4-cyclohexanediol or of 1,4-cyclohexanedimethanol. The alcohol constituent of the semi-crystalline polyester (b) containing end carboxyl groups can also contain up to 15 mol % of one or more other aliphatic or cycloaliphatic di- or polyols, such as ethylene glycol, propylene glycol, 1,4-butanediol, 1,5-pentanediol, 1,6-hexanediol, 1,4-cyclohexanediol, 1,4-cyclohexanedimethanol and hydrogenated bisphenol A. For the preparation of branched polyesters, use is advantageously made of trihydroxylated or tetrahydroxylated polyols, such as trimethylolpropane, ditrimethylolpropane, trimethylol-ethane or pentaerythritol and their mixtures.

The acrylic copolymers containing ethylenically unsaturated groups, preferably acryloyl or methacryloyl groups, incorporated in the compositions in accordance with the present invention most often exhibit a degree of unsaturation of 0.35 to 3.5, preferably of 0.5 to 2.5, milliequivalents of double bonds per gram of acrylic copolymer.

In addition, these acrylic copolymers preferably exhibit the following characteristics:

a number-average molecular weight of between 1000 and 8000, preferably between 2000 and 6000, measured by gel permeation chromatography (or GPC), a glass transition temperature ranging from 45 to 100° C., a viscosity, measured by the cone/plate method (ICI viscosity) according to ASTM standard D 4287-88, at 125° C. ranging from 10,000 to 100,000 mPa·s.

The acrylic copolymer containing ethylenically unsaturated groups is prepared in two stages, the first being a radical polymerization.

In the first stage, an acrylic copolymer carrying functional groups is prepared by radical copolymerization of three types of different monomers (c.1.1), (c.1.2) and (c.1.3).

The monomer (c.1.1) contains the acryloyl or methacryloyl group and is chosen from monomers such as methyl, ethyl, propyl, n-butyl, isobutyl, tert-butyl, 2-ethylhexyl, stearyl, tridecyl, cyclohexyl, benzyl, phenyl, dimethylaminoethyl, diethylaminoethyl, isobornyl, polysiloxane or caprolactone acrylates or methacrylates, and the like. These monomers can be used alone but they are most often used as a mixture. 40 to 95 mol % thereof are introduced into the acrylic copolymer, calculated with respect to the combined monomers (c.1.1) and (c.1.2).

The monomer (c.1.2) is an ethylenically unsaturated compound other than the monomer (c.1.1) and is chosen from styrene, α-methylstyrene, vinyltoluene, acrylonitrile, methacrylonitrile, vinyl acetate or propionate, acrylamide, methacrylamide, methylolmethacrylamide, vinyl chloride, ethylene, propylene, olefins having from 4 to 20 carbon atoms, and the like. These monomers are used alone or as a mixture, in an amount of 5 to 60 mol % with respect to the combined monomers (c.1.1) and (c.1.2).

The monomer (c.1.3) is an ethylenically unsaturated compound other than the monomers (c.1.1) and (c.1.2) and it carries a functional group capable of undergoing an addition or condensation reaction. The glycidyl, carboxyl, hydroxyl or isocyanato group is chosen from these functional groups. Monomers carrying such functional groups are, for example, glycidyl acrylate or methacrylate, acrylic or methacrylic acid, hydroxyethyl acrylate or methacrylate and 2-isocyanatoethyl methacrylate or methacryloyl isocyanate, 1-(1-isocyanato-1-methylethyl)-3-(1-methylethenyl) benzene, maleic anhydride or alternatively tetrahydrophthalic anhydride. 5 to 60 mol % of the monomer (c.1.3) are used with respect to the combined monomers (c.1.1) and (c.1.2).

The monomer (c.1.3) can be completely, but preferably partially, replaced by polymerization initiators carrying one of the abovementioned functional groups, for example 4,4'-azobis(2-cyanovaleric acid), which will introduce a carboxyl group, or 2,2'-azobis[2-methyl-N-(2-hydroxyethyl) propionamide], which will introduce a hydroxyl group into the chain of the acrylic copolymer which will carry one of these functional groups. Likewise, chain transfer agents can play the same role, such as 3-mercaptopropionic acid or 3-mercapto-1-propanol.

In the second stage of preparation of the acrylic copolymer containing ethylenically unsaturated groups, preferably acryloyl or methacryloyl groups, the acrylic copolymer carrying functional groups introduced by the monomer (c.1.3) is reacted with a monomer (c.2) which contains both an ethylenically unsaturated group and a functional group capable of undergoing an addition or condensation reaction with the functional groups of the acrylic copolymer introduced by the monomer (c.1.3). These monomers (c.2) are, for example, glycidyl acrylate or methacrylate, acrylic or methacrylic acid, hydroxyethyl acrylate or methacrylate, 2-isocyanatoethyl methacrylate, methacryloyl isocyanate, 1-(1-isocyanato-1-methylethyl)-3-(1-methylethenyl) benzene, maleic anhydride or tetrahydrophthalic anhydride. In fact, these monomers (c.2) are the same as the monomers (c.1.3); however, use will preferably be made of unsaturated monomers (c.2) in which the ethylenically unsaturated group is an acryloyl or methacryloyl group. It is obvious that a monomer (c.2) is chosen in which the functional group is capable of reacting with that of the acrylic copolymer prepared in the first stage. Thus, if the acrylic copolymer contains glycidyl groups, it will be made to react with acrylic or methacrylic acid, for example. Conversely, if the acrylic copolymer contains carboxyl groups, for example introduced by acrylic or methacrylic acid, it will be made to react with glycidyl or β-methylglycidyl acrylate or methacrylate. If the acrylic copolymer contains the isocyanato group, it will be made to react with hydroxyethyl acrylate or methacrylate, and the like.

An essential characteristic of the semi-crystalline polyesters and of the acrylic copolymers incorporated in the compositions in accordance with the present invention is that they are composed of chains which virtually all contain ethylenically unsaturated groups, preferably acryloyl and/or methacryloyl groups, which can be crosslinked by irradiation.

In order to be usable in powder compositions, the semi-crystalline polyesters must necessarily meet the following requirements:
- the polyesters must exhibit a sufficiently high degree of crystallinity; the latter will, for example, be greater than or equal to 10 joules/g, preferably 15 joules/g, determined according to ASTM standard D 3418-82; and
- the crystallization time must be sufficiently short.

In order to meet these requirements, it is necessary for the chain of the polyester to be as regular as possible. For this purpose, it is preferable for the acid and alcohol constituents entering into the composition of the semi-crystalline polyester to be symmetrical compounds.

Moreover, it should be noted that the reaction with a glycidyl methacrylate does not affect the semi-crystalline nature of the polyester obtained.

By virtue of the semi-crystalline nature of the polyesters used in the compositions according to the present invention, the powders exhibit very good stability on storage and coatings can be obtained at low application temperatures of the order of 100 to 150° C. It is also obvious that the lowering of the application temperature is economically advantageous, since it results in a saving in energy. Another not insignificant advantage is that it is possible to obtain coatings on substrates which are more sensitive to heat, such as, for example, wood and plastics, thus widening the field of application of products of this type.

However, with respect to known semi-crystalline polyesters and acrylic copolymers, which do not contain ethylenically unsaturated groups, the semi-crystalline polyesters containing end methacryloyl groups and acrylic copolymers containing ethylenically unsaturated groups which are incorporated in the powder compositions in accordance with the invention also exhibit a series of additional, very important advantages.

As has already been explained in the introduction to the present description, in order that they may be cured under the effect of heat at low temperature, known semi-crystalline polyesters, used alone or as a mixture with an acrylic copolymer, require the presence of a crosslinking agent and of a catalyst with, as a consequence, the formation of defective coatings (gelled particles and orange peel).

The essential advantage of the powder compositions comprising a mixture of semi-crystalline polyesters and of acrylic copolymers in accordance with the invention is that they can be cured at low temperature, without either an additional crosslinking agent or a catalyst, by ultraviolet irradiation or by accelerated electron beams, after a very short period of time in the molten state, ranging from 1 to 5 minutes.

This makes it possible to overcome, to a large extent, the disadvantages described above which the presence of a crosslinking agent and catalyst introduces.

This is because, in view of the absence of crosslinking agent, any premature reaction with the latter is excluded during the preparation of the powder in the extruder and in particular at the time when the molten film has to be spread over the surface of the substrate to be coated. The viscosity which is suitable for providing perfect spreading of the molten film, given that the crosslinking resulting in the curing of the molten film only begins at the time of the exposure of the latter to ultraviolet radiation or to accelerated electron beams, can consequently easily be obtained. These advantages are reflected in reality by the production of very taut coatings having a smooth appearance and without apparent defects.

Another advantage of the powder compositions comprising a mixture of semi-crystalline polyesters and of acrylic copolymers in accordance with the invention, as will be shown in the following examples, is that they provide, after curing by radiation, coatings which exhibit good flexibility, much better than that of the coatings obtained from compositions containing an acrylic copolymer alone, without semi-crystalline polyester. Moreover, at the same time, an excellent surface hardness is obtained which is as good as that which is obtained from compositions containing an acrylic copolymer alone; the latter result is unexpected, insofar as it is known that the incorporation of conventional semi-crystalline polyesters, carrying carboxyl or hydroxyl groups, in compositions containing amorphous polyesters or acrylic copolymers carrying the same functional groups results in a lowering in the surface hardness.

The radiation-curable powder compositions in accordance with the invention comprising a mixture of at least one semi-crystalline polyester containing end methacryloyl groups and an acrylic copolymer containing ethylenically unsaturated groups preferably contain from 40 to 100 parts by weight of semi-crystalline polyesters and acrylic copolymers per 100 parts of the composition. In addition to the semi-crystalline polyesters and acrylic copolymers, these compositions optionally contain a photoinitiator and the various additional substances conventionally used in the manufacture of powder paints and varnishes. These compositions preferably contain 5 to 50 parts by weight and more particularly 5 to 35 parts by weight of the semi-crystalline polyester containing end methacryloyl groups, besides 50 to 95 parts by weight and preferably 65 to 95 parts by weight of the acrylic copolymer containing ethylenically unsaturated groups, with respect to the combined weight of the polymers.

In addition, according to an alternative form of the embodiment of the invention, the radiation-curable powder compositions also comprise an ethylenically unsaturated oligomer. Mention will be made, as examples of these ethylenically unsaturated oligomers, of the triacrylate and the trimethacrylate of tris(2-hydroxyethyl) isocyanurate, the epoxy acrylates and methacrylates which are formed by reaction of an epoxy compound (for example, the diglycidyl ether of bisphenol A) with acrylic or methacrylic acid, or the urethane acrylates and methacrylates which are formed by reaction of an organic di- or polyisocyanate with a hydroxyalkyl acrylate or a hydroxyalkyl methacrylate and optionally a mono- and/or polyhydroxylated alcohol (for example, the reaction product of hydroxyethyl acrylate or methacrylate with toluene diisocyanate or isophorone diisocyanate). As these ethylenically unsaturated oligomers contain polymerizable double bonds, they also participate in the radiation curing and can consequently provide coatings with a surface hardness which is further increased. Depending upon the applications envisaged, the compositions in accordance with the invention contain 0 to 20, preferably 0 to 10, parts by weight of ethylenically unsaturated oligomer per 100 parts of composition in accordance with the invention.

In order to prepare the semi-crystalline polyesters containing end methacryloyl groups, the preparation is first carried out of a polyester containing end carboxyl groups, with a straight or branched chain, and the polyester containing end carboxyl groups thus prepared is then reacted with glycidyl methacrylate or β-methylglycidyl methacrylate.

The semi-crystalline polyester containing end carboxyl groups is prepared according to the conventional methods for the synthesis of polyesters by esterification in one or more stages.

If the semi-crystalline polyester containing end carboxyl groups is obtained in one stage, a stoichiometric excess of one or more appropriate di- or polycarboxylic acids and one or more appropriate diols or polyols are reacted together.

In order to obtain a semi-crystalline polyester containing end carboxyl groups in two stages, a polyester containing end hydroxyl groups is first prepared from one or more appropriate di- or polycarboxylic acids and from a stoichiometric excess of one or more appropriate diols or polyols and the polyester containing end hydroxyl groups thus obtained is then esterified with one or more other appropriate di- or polycarboxylic acids in order to obtain a semi-crystalline polyester containing end carboxyl groups.

For the preparation of the semi-crystalline polyesters containing end carboxyl groups, use is generally made of a conventional reactor equipped with a stirrer, an inert gas (nitrogen) inlet, a distillation column connected to a water-cooled condenser and a thermometer connected to a thermoregulator.

The esterification conditions used for the preparation of these polyesters are conventional, namely that it is possible to use an ordinary esterification catalyst derived from tin, such as dibutyltin oxide, dibutyltin dilaurate or n-butyltin trioctanoate, or derived from titanium, such as tetrabutyl titanate, in the proportion of 0 to 1% by weight of the reactants, and optionally to add antioxidants, such as the phenol compounds Irganox 1010 (Ciba-Geigy) or Ionol CP (Shell), alone or stabilizers of phosphonite or phosphite type, such as tributyl phosphite or triphenyl phosphite, in the proportion of 0 to 1% by weight of the reactants.

The polyesterification is generally carried out at a temperature which is gradually increased from 130° C. to approximately 180 to 250° C., first at normal pressure and then under reduced pressure at the end of each stage of the process, these conditions being maintained until a polyester is obtained which exhibits the desired hydroxyl number and/or acid number. The degree of esterification is monitored by determination of the amount of water formed during the reaction and of the properties of the polyester obtained, for example the hydroxyl number, the acid number, the molecular weight and/or the viscosity.

The semi-crystalline polyesters containing carboxyl groups thus obtained most often exhibit the following characteristics:

- an acid number of 10 to 150 mg of KOH/g, preferably of 20 to 100 mg of KOH/g,
- a number-average molecular weight of between 800 and 20,000, preferably between 1000 and 8500,
- a well1-defined melting point of approximately 60 to 150° C., determined by differential scanning calorimetry (or DSC) according to ASTM standard D 3418-82,
- a viscosity in the, molten state of less than 10,000 mPa·s, measured at 175° C. with a cone/plate viscometer (known under the name of "ICI viscosity") according to ASTM standard D 4287-88, and
- a functionality which is, preferably, between 2 and 3.

The semi-crystalline polyesters containing methacryloyl groups are prepared in the following way. On completion of the polycondensation, the polyester, in the molten state, which is found in the reactor described above, is allowed to cool to a temperature of between 100 and 160° C., and the radical polymerization inhibitor and then, slowly, a substantially equivalent amount of glycidyl methacrylate or of 5-methylglycidyl methacrylate are added thereto.

The operating conditions used for the preparation of the semi-crystalline polyesters containing end methacryloyl groups are also conventional, namely that it is possible to use a catalyst for the acid/epoxy reaction, for example amine-containing derivatives, such as 2-phenyl-imidazoline, phosphines, such as triphenylphosphine, quaternary ammonium compounds, such as tetrapropylammonium chloride or tetrabutylammonium bromide, or phosphonium salts, such as ethyltriphenyl-phosphonium bromide or benzyltriphenylphosphonium chloride, or chromium-based catalysts, in the proportion of 0.01 to 1.0% by weight of the reactants, and to add radical polymerization inhibitors, such as phenothiazine, or an inhibitor of hydroquinone type, in the proportion of 0.01 to 1.0% by weight of the reactants.

The addition reaction is generally carried out at a temperature of between 100 and 160° C. The degree of progression of the reaction is monitored by determination of the properties of the polyester obtained, for example the hydroxyl number, the acid number, the degree of end unsaturation and/or the content of residual epoxy groups.

The acrylic copolymer carrying functional groups is prepared, in a first stage, by polymerization techniques known per se, either in bulk, or in emulsion, or in suspension or alternatively in solution in an organic solvent. Mention may be made, among these solvents, of toluene, ethyl acetate, n-butyl acetate, xylene, and the like. The monomers are copolymerized in the presence of a radical polymerization initiator (benzoyl peroxide, tert-butyl peroxide, decanoyl peroxide, azobisisobutyronitrile, tert-amyl peroxyacetate, 4,4'-azobis(2-cyanovaleric acid), 2,2'-azobis [2-methyl-N-(2-hydroxyethyl)propionamide], and the like), in an amount representing from 0.1 to 5% by weight of the monomers.

In order to obtain good control of the molecular weight, a chain transfer agent is optionally added during the reaction, this chain transfer agent preferably being of the mercaptan type, such as n-dodecyl mercaptan, t-dodecanethiol, isooctyl mercaptan, 3-mercaptopropionic acid, 3-mercapto-1-propanol, and the like, or of the carbon halide type, such as carbon tetrabromide, bromotrichloromethane, and the like. The chain transfer agent is used in an amount of between 0 and 10% by weight of the monomers charged to the copolymerization.

For the preparation of the acrylic copolymer carrying functional groups, use is generally made of a jacketed cylindrical reactor equipped with a stirrer, a reflux condenser, an inert gas (for example nitrogen) inlet and outlet pipe and a system for feeding via a metering pump.

The conditions of the polymerization are conventional. Thus, in the case of the preparation by solution polymerization, for example, the organic solvent is introduced into the reactor and brought to reflux under an inert gas (nitrogen, carbon dioxide, and the like) atmosphere and then a homogeneous mixture of the monomers, of the radical polymerization initiator and, optionally, of the chain transfer agent is gradually added thereto over several hours. The reaction mixture is kept stirring at reflux for a further few hours and then most of the solvent is distilled off. The copolymer obtained is subsequently freed from the remainder of the solvent under vacuum. The acrylic copolymer obtained exists in the form of a solid product which can be easily ground into an off-white powder.

In a second stage, the acrylic copolymer carrying functional groups is reacted with the monomer (c.2) which contains both an ethylenically unsaturated group, preferably acryloyl or methacryloyl, and a functional group capable of reacting with the functional group of the acrylic copolymer.

The reaction is carried out either in bulk or in a solvent as described in the first stage. The monomer is slowly added to the reaction mixture containing the acrylic copolymer carrying functional groups, the radical polymerization inhibitor in the proportion of 0.01 to 1% by weight of the reactants and, optionally, a catalyst in the proportion of 0.01 to 1% by weight of the reactants, at a temperature of between 50 and 150° C. The reaction mixture is kept stirring for several hours. The degree of progression of the reaction is monitored by titration.

According to an alternative operating form applicable when the preparation is carried out of an acrylic copolymer carrying carboxyl groups which is then reacted with a glycidyl acrylate or methacrylate, the semi-crystalline polyester containing carboxyl groups is first prepared as explained above. The polymerization of the monomers in order to prepare the acrylic copolymer is carried out directly in solution in the molten polyester. In a subsequent stage, the carboxyl groups of the polyester and of the acrylic copolymer are reacted by adding glycidyl or β-methylglycidyl methacrylate thereto. The progression of the reaction is monitored by determining the acid number. A mixture of a polyester containing end methacryloyl groups and of an acrylic copolymer containing methacryloyl groups is thus obtained, which mixture is then mixed with the other additives, as will be seen later.

The mixtures of the semi-crystalline polyesters containing end methacryloyl groups and of the acrylic copolymers containing ethylenically unsaturated groups described above are intended to be used as binders in the preparation of powder compositions curable by ultraviolet irradiation or by accelerated electron beams, it, being possible for the said compositions to be used in particular as varnishes and paints which lend themselves to application according to the technique of deposition by means of a triboelectric or electrostatic spray gun or according to the technique of deposition in a fluidized bed.

This is why the present invention additionally relates to the use of the radiation-curable powder compositions in accordance with the invention for the preparation of powder varnishes and paints, as well as to the powder varnishes and paints obtained using these compositions.

Finally, the present invention also relates to a process for coating an article which is characterized by the application to the said article of a radiation-curable powder composition in accordance with the invention by deposition by spraying with a triboelectric or electrostatic gun or by deposition in a fluidized bed, followed by the melting of the coating thus obtained by heating at a temperature of 100 to 150° C. for a time of 1 to 5 minutes and by the curing of the coating in the molten state by ultraviolet irradiation or by accelerated electron beams.

For the radiation curing of the powder compositions in accordance with the invention with accelerated electron beams, it is not necessary to use a photoinitiator, seeing that this type of radiation provides by itself alone a production of free radicals which is sufficiently high for the curing to be extremely rapid. In contrast, when it concerns the photocuring of the powder compositions in accordance with the invention with radiation where the wavelengths are between 170 and 600 nanometres (UV radiation), the presence of at least one photoinitiator is essential.

The photoinitiators which can be used according to the present invention are chosen from those commonly used for this purpose.

The appropriate photoinitiators which can be used are aromatic carbonyl compounds, such as benzophenone and its alkylated or halogenated derivatives, anthraquinone and its derivatives, thioxanthone and its derivatives, benzoin ethers, aromatic or non-aromatic α-diones, benzil dialkyl acetals, acetophenone derivatives and phosphine oxides.

Photoinitiators which may be suitable are, for example, 2,2'-diethoxyacetophenone, 2-, 3- or 4-bromoacetophenone, 2,3-pentanedione, hydroxy-cyclohexyl phenyl ketone, benzaldehyde, benzoin, benzophenone, 9,10-dibromoanthracene, 2-hydroxy-2-methyl-1-phenylpropan-1-one, 4,4'-dichloro-benzophenone, xanthone, thioxanthone, benzil dimethyl ketal, diphenyl (2,4,6-trimethylbenzoyl) phosphine oxide, and the like. It may optionally be advantageous to use a photoactivator, such as tributylamine, 2-(2-aminoethylamino)ethanol, cyclohexylamine, diphenylamine, tribenzylamine or aminoacrylates, such as, for example, the addition product of a secondary amine, such as dimethylamine, diethylamine, diethanolamine, and the like, with a polyol polyacrylate, such as the diacrylate of trimethylolpropane, of 1,6-hexenediol, and the like.

The powder compositions in accordance with the invention contain 0 to 15 and preferably 0.5 to 8 parts by weight of photoinitiators per 100 parts by weight of composition in accordance with the invention.

The radiation-curable powder compositions in accordance with the invention can also contain various additional substances conventionally used in the manufacture of powder paints and varnishes.

The additional substances optionally added to the radiation-curable powder compositions in accordance with the invention are, inter alia, compounds which absorb ultraviolet radiation, such as Tinuvin 900 (from Ciba-Geigy Corp.), light stabilizers based on sterically hindered amines (for example Tinuvin 144 from Ciba-Geigy Corp.), fluidity-regulating agents, such as Resiflow PV5 (from Worlee), Modaflow (from Monsanto), Acronal 4F (from BASF) or Crylcoat 109 (from UCB), degassing agents, such as benzoin, and the like.

A variety of pigments and of inorganic fillers can also be added to the radiation-curable powder compositions in accordance with the invention. Mention will be made, as examples of pigments and of fillers, of metal oxides, such as titanium dioxide, iron oxide, zinc oxide, and the like, metal hydroxides, metal powders, sulphides, sulphates, carbonates, silicates, such as, for example, aluminium silicate, carbon black, talc, kaolins, barytas, iron blues, lead blues, organic reds, organic maroons, and the like.

These additional substances are used in the usual amounts, it being understood that if the radiation-curable compositions in accordance with the invention are used as varnishes, the addition of additional substances having opacifying properties will be omitted.

For the preparation of the radiation-curable powder compositions, the semi-crystalline polyester containing end methacryloyl groups, the acrylic copolymer containing ethylenically unsaturated groups and optionally the ethylenically unsaturated oligomer and optionally the photoinitiator, and the various additional substances conventionally used for the manufacture of powder paints and varnishes, are dry mixed, for example in a tumbling mixer. It is also possible to begin by mixing the semi-crystalline polyester and the acrylic copolymer in the molten state or using the acrylic copolymer synthesized in the crystalline polyester, and then to mix these two with the other constituents of the powder. The mixture is then homogenized at a temperature lying within the range from 70 to 150° C. in an extruder, for example a Buss-Ko-Kneter single-screw extruder or a twin-screw extruder of Werner-Pfleiderer, APV-Baker or Prism type. The extrudate is then allowed to cool, is ground and is sieved in order to obtain a powder in which the size of the particles is between 10 and 150 micrometers.

Instead of the above method, it is also possible to dissolve the semi-crystalline polyester and the acrylic copolymer containing ethylenically unsaturated groups, and optionally the unsaturated oligomer, and optionally the photoinitiator, and the various additional substances, in a solvent, such as dichloromethane, to grind in order to obtain a homogeneous suspension containing approximately 30% by weight of solid matter and subsequently to evaporate the solvent, for example by spray drying.

The powder paints and varnishes thus obtained are entirely suitable for application to the article to be coated by conventional techniques, that is to say by the well-known technique of deposition in a fluidized bed or by application with a triboelectric or electrostatic spray gun.

After having been applied to the article concerned, the coatings deposited are heated in a forced circulation oven or by means of infrared lamps at a temperature of 100 to 150° C. for a time of 1 to 5 minutes for the purpose of obtaining the melting and the spreading of the powder particles as a smooth, uniform and continuous coating at the surface of the said article. The molten coating is then cured by radiation, such as the ultraviolet light emitted, for example, by medium-pressure mercury vapour UV radiators, of at least 80 to 240 W/linear cm, or by any other well-known source of the state of the art, at a distance of 5 to 20 cm and for a time of 1 to 20 seconds.

The molten coating can also be cured with accelerated electron beams of at least 150 KeV, the power of the devices employed being a direct function of the thickness of the composition layer to be cured by polymerization.

The radiation-curable powder compositions in accordance with the invention can be applied to the most diverse substrates, such as, for example, paper, cardboard, wood, textiles, metals of different nature, plastics, such as polycarbonates, poly(meth)acrylates, polyolefins, polystyrenes, poly(vinyl chloride)s, polyesters, polyurethanes, polyamides, copolymers such as acrylonitrile-butadiene-styrene (ABS) or cellulose acetate butyrate, and the like.

The examples which follow illustrate the invention without limiting it. Except when otherwise indicated, the parts mentioned in the examples are parts by weight.

EXAMPLE 1

Synthesis of a Semi-crystalline Polyester Containing End Methacryloyl Groups in Three Stages 1st Stage.

419.2 parts of 1,6-hexanediol and 2.1 parts of n-butyltin trioctoate, as catalyst, are introduced into a four-necked round-bottomed flask equipped with a stirrer, a distillation column connected to a water-cooled condenser, a nitrogen inlet pipe and a thermometer connected to a thermoregulator. The mixture is heated in a nitrogen atmosphere and with stirring to a temperature of approximately 140° C., 545.4 parts of terephthalic acid are then added, still with stirring, and the mixture is gradually heated until the temperature reaches 230° C. After approximately 95% of the theoretical amount of water formed has been collected, a transparent polyester is obtained.

The semi-crystalline polyester containing end hydroxyl groups thus obtained exhibits the following characteristics:

| acid number | 6 mg of KOH/g |
| hydroxyl number | 41 mg of kOH/g |

2nd Stage.

The polyester containing end hydroxyl groups obtained in the first stage is allowed to cool to 200° C. and 84.8 parts of isophthalic acid are added thereto. The reaction mixture is then gradually heated to a temperature of 225° C. The reaction mixture is left at this temperature for approximately 2 hours, until the reaction mixture becomes transparent, 0.8 part of tributyl phosphite is added thereto and the pressure is gradually decreased to 50 mm Hg. The reaction is continued for a further 3 hours at 225° C. under reduced pressure.

The semi-crystalline polyester containing end carboxyl groups thus obtained exhibits the following characteristics:

| acid number | 31 mg of KOH/g |
| hydroxyl number | 2 mg of KOH/g |
| ICI viscosity at 175°0 C. | 2500 mPa.s |

3rd Stage.

The polyester containing end carboxyl groups obtained in the second stage is allowed to cool to 150° C. and 0.5 part of di-tert-butylhydroquinone, as polymerization inhibitor, and 4.6 parts of ethyltriphenylphosphonium bromide, as catalyst, are added thereto. 70.3 parts of glycidyl methacrylate are then added thereto slowly in an oxygen atmosphere and with stirring. One hour after the addition has been completed, a semi-crystalline polyester containing end methacryloyl groups is obtained which exhibits the following characteristics:

| acid number | 1 mg of KOH/g |
| hydroxyl number | 28 mg of KOH/g |
| content of unsaturations | 0.5 milliequivalent db/g |
| ICI viscosity at 150° C. | 4000 mPa.s |
| melting temperature (determined by differential scanning calorimetry (or DSC) with a rate of heating of 20° C. per minute) | 120° C. |
| $\overline{M}n$ (GPC) | 4020 |

EXAMPLE 2

Synthesis of a Semi-crystalline Polyester Containing End Methacryloyl Groups in Two Stages.

1st Stage.

152.2 parts of ethylene glycol, 727.1 parts of 1,12-dodecanedioic acid and 2.0 parts of n-butyltin trioctoate, as catalyst, are introduced into a four-necked round-bottomed flask equipped with a stirrer, a distillation column connected to a water-cooled condenser, a nitrogen inlet pipe and a thermometer connected to a thermoregulator. The mixture is heated in a nitrogen atmosphere and with stirring to a temperature of approximately 140° C., at which the water formed begins to distil. The heating is then continued gradually until the reaction mass reaches a temperature of 220° C. When the distillation at atmospheric pressure stops, 0.8 part of tributyl phosphite is added and a vacuum of 50 mm Hg is gradually established. The reaction is continued for a further 3 hours at 220° C. under a pressure of 50 mm Hg.

The semi-crystalline polyester containing end carboxyl groups thus obtained exhibits the following characteristics:

| | |
|---|---|
| acid number | 102 mg of KOH/g |
| hydroxyl number | 4 mg of KOH/g |

2nd Stage.

The procedure described in the third stage of Example 1 is followed but the polyester containing end carboxyl groups obtained in the first stage is allowed to cool beforehand to a temperature of 140° C.; 3.9 parts of benzyltriphenylphosphonium chloride and 1.2 parts of di-tert-butylhydroquinone are added; 201.1 parts of glycidyl methacrylate are slowly added. The reaction mixture is kept stirring for one hour at 140° C. under oxygen.

A semi-crystalline polyester containing end methacryloyl groups is obtained which exhibits the following characteristics:

| | |
|---|---|
| acid number | 1.7 mg of KOH/g |
| hydroxyl number | 78 mg of KOH/g |
| content of unsaturations | 1.4 milliequivalents db/g |
| ICI viscosity at 100° C. | 10 mPa.s |
| melting temperature (DSC; 20° C./min) | 67° C. |
| $\overline{M}n$ (GPC) | 1406 |

EXAMPLE 3

Synthesis of an Acrylic Copolymer Containing Methacryloyl Groups in Two Stages

1st Stage.

358.7 parts of n-butyl acetate are introduced into a 5 litre jacketed reactor equipped with a stirrer, a water-cooled condensor, a nitrogen inlet pipe and a temperature probe connected to a thermoregulator. The contents of the reactor are heated and stirred while the solvent is purged by means of nitrogen. When the temperature reaches 92° C., a mixture of 5.67 parts of 2,2'-azobis(2-methylbutanenitrile) in 89.6 parts of n-butyl acetate is added to the reaction mixture. This mixture is added over a time of 215 minutes by means of a peristaltic pump. Five minutes after the beginning of the addition of this mixture, the addition is begun to the reaction mixture of a mixture comprising 127.5 parts of glycidyl methacrylate, 170.8 parts of isobornyl acrylate, 3.78 parts of butyl methacrylate, 146.3 parts of styrene, 17.93 parts of n-dodecyl mercaptan and 2.24 parts of ditridecyl thiodipropionate. The latter mixture is added over a time of 180 minutes, by means of another peristaltic pump. After a total synthesis time of 315 minutes, the reaction mixture is poured into a rotary evaporator and the solvent is evaporated at a temperature of 150° C. for 45 minutes.

The acrylic copolymer carrying the glycidyl functional group is obtained in the form of a white powder. Its content of epoxy groups (E.E.W.) is 1.89 meq/g and its viscosity, measured with a cone/plate viscometer (ICI viscosity), is 50,000 mPa·s at 125° C.

2nd Stage.

The copolymer obtained in the first stage is placed in a 5 litre round-bottomed flask equipped with an air inlet pipe, a temperature probe connected to a thermoregulator and an inlet pipe for the reactant which will be used. The copolymer is heated to 100° C., while continuing to purge it by means of air. After 30 minutes, 0.08 part of di-tert-butylhydroquinone is added to the copolymer. 60 minutes later, 77.21 parts of methacrylic acid are added to the reaction mixture over 30 minutes, by means of a peristaltic pump. The temperature is kept constant throughout the synthesis. The acid number is determined at regular intervals by titration. When the value of this acid number reaches 6.2 mg of KOH/g, the acrylic copolymer containing methacryloyl groups thus obtained is cooled.

The characteristics of this copolymer are as follows:

| | |
|---|---|
| content of unsaturations | 1.63 meq db/g |
| cone/plate viscosity at 125° C. | 65,000 mPa.s |
| Tg (DSC, 20° C./min) | 58° C. |
| $\overline{M}n$ (GPC) | 5645 |

EXAMPLE 4

Synthesis of an Acrylic Copolymer Containing Methacryloyl Groups, in Two Stages

1st Stage.

221.3 parts of n-butyl acetate are introduced into the same equipment as that used in the 1st stage of Example 3 and are heated with stirring and while purging by means of nitrogen. A mixture of 102.7 parts of hydroxyethyl methacrylate, 88.54 parts of isobornyl acrylate, 162.9 parts of methyl methacrylate, 88.54 parts of n-butyl acrylate and 13.39 parts of 2,2'-azobis(2-methylpropanenitrile) is added, by means of a as peristaltic pump, over 180 minutes at a temperature of 110° C. After a total synthesis time of 315 minutes, the acrylic copolymer carrying hydroxyl functional groups thus obtained exhibits the following characteristics:

| | |
|---|---|
| hydroxyl number | 96.5 mg of KOH/g |
| cone/plate viscosity at 125° C. | 22,500 mPa.s |
| Tg | 53° C. |

2nd Stage.

The solution obtained on conclusion of the 1st stage is placed in the same equipment as in the 2nd stage of Example 3. The round-bottomed flask used in the 1st stage is rinsed by means of 234.7 parts of n-butyl acetate, which are added to the round-bottomed flask used in the 2nd stage. The reaction mixture is heated to 40° C. and purged by means of air. After 30 minutes, 0.09 part of Norsocryl 200 (an inhibitor sold by the company Elf Atochem) is added to the reaction mixture. One hour later, 87.6 parts of methacryloyl isocyanate are added to the reaction mixture by means of a peristaltic pump over 180 minutes at constant temperature. The content of isocyanato groups is determined at regular intervals by back titration of dibutylamine by means of hydrochloric acid. When the content of isocyanato groups has fallen to less than 0.3% of its starting value, the reaction mixture is placed in a rotary evaporator and the solvent is evaporated at 30° C. under vacuum. The acrylic copolymer containing methacryloyl groups thus obtained exhibits the following characteristics:

| | |
|---|---|
| content of unsaturations | 1.45 meq db/g |
| Tg | 51° C. |
| $\overline{M}n$ (GPC) | 3125 |
| cone/plate viscosity at 100° C. | 50,000 mPa.s. |

EXAMPLE 5

Synthesis of a Mixture of a Semi-crystalline Polyester Containing End Methacryloyl Groups And of an Acrylic Copolymer Containing Methacryloyl Groups, in Three Stages 1st stage. Synthesis of the Semi-crystalline Polyester Containing End Carboxyl Groups.

A mixture of 216.5 parts of ethylene glycol, of 905.7 parts of 1,12-dodecanedioic acid and of 2.5 parts of n-butyltin trioctoate is reacted according to the procedure of Example 1. The contents of the reactor are heated with stirring and under nitrogen, until the temperature reaches 140° C. The water released by the reaction begins to distill at this point. Heating is continued to a temperature of 220° C. When distillation at normal pressure halts, 1.0 part of tributyl phosphite is added to the reaction mixture, which is gradually placed under a vacuum of 50 mm Hg. After 3 hours at 220° C. and under 50 mm Hg, a semi-crystalline polyester containing carboxyl groups is obtained which exhibits the following characteristics:

| acid number | 56 mg of KOH/g |
|---|---|
| hydroxyl number | 2 mg of KOH/g |
| cone/plate viscosity at 100° C. | 950 mPa.s |

2nd Stage. Synthesis of an Acrylic Copolymer Containing Carboxyl Groups in the Polyester Obtained in the 1st Stage.

264.6 parts of the polyester obtained in the first stage are introduced into a 3 litre round-bottomed flask equipped with a stirrer, a water-cooled condenser, a nitrogen inlet pipe and a temperature probe connected to a thermoregulator. The contents of the round-bottomed flask are heated with stirring and while purging the polyester by means of nitrogen. A mixture of 220.3 parts of butyl methacrylate, 41.9 parts of styrene, 200.7 parts of isobornyl acrylate, 64.8 parts of acrylic acid, 10.02 parts of 2,2'-azobis(2-methylbutanenitrile) and 36.97 parts of n-dodecyl mercaptan is added to the reaction mixture, by means of a peristaltic pump, over 180 minutes at a temperature of 92° C. The temperature is kept constant at +/−0.3° C. throughout the duration of the synthesis, which takes 315 minutes. The mixture of the semi-crystalline polyester containing carboxyl groups and of the acrylic copolymer carrying carboxyl groups obtained on conclusion of the 2nd synthesis stage exhibits the following characteristics:

| Tg (DSC, 20° C./min) | 69° C. |
|---|---|
| cone/plate viscosity at 125° C. | 1800 mPa.s |
| acid number | 75.8 mg of KOH/g |

3rd Stage. Synthesis of the Mixture of the Semi-Crystalline Polyester Containing Methacryloyl Groups and of the Acrylic Copolymer Containing Methacryloyl Groups.

The mixture of the polymers as obtained on conclusion of the 2nd synthesis stage is heated to 130° C. in the same equipment, the mixture is purged with air and 0.1 part of di-tert-butylhydroquinone is added. After 30 minutes, 160.71 parts of glycidyl methacrylate are added to the reaction mixture by means of a peristaltic pump over 30 minutes. The acid number is monitored at regular intervals. After 240 minutes, the latter exhibits a value of 12 mg KOH/g. The mixture of the semi-crystalline polyester containing methacryloyl groups and of the acrylic copolymer containing methacryloyl groups thus obtained exhibits the following characteristics:

| Tg (DSC, 20° C./min) | 66° C. |
|---|---|
| cone/plate viscosity at 125° C. | 400 mPa.s |
| content of unsaturations | 0.911 meq db/g |
| $\overline{M}n$ (GPC) | 5280 |

Per 100 parts by weight, the mixture contains 31.4 parts of the semi-crystalline polyester containing end methacryloyl groups and 68.6 parts of the acrylic copolymer containing methacryloyl groups.

EXAMPLE 6

Synthesis of a Semi-crystalline Polyester Containing End Methacryloyl Groups in 2 Stages 1st Stage A mixture of 191.4 parts of ethylene glycol, of 800.6 parts of 1,12-dodecanedioic acid and of 2.2 parts of n-butyltin trioctoate, as catalyst, is reacted according to the complete procedure described in the first stage of Example 2.

The semi-crystalline polyester containing end carboxyl groups thus obtained exhibits the following characteristics:

| acid number | 52 mg of KOH/g |
|---|---|
| hydroxyl number | 2 mg of KOH/g |

2nd Stage

The polyester obtained in the 1st stage is allowed to cool to a temperature of 140° C. and 0.7 part of di-tert-butylhydroquinone and 4.4 parts of benzyltriphenylphosphonium chloride are added thereto. 111.8 parts of glycidyl methacrylate are then added slowly to this mixture and the mixture is left stirring for one hour at 140° C. under oxygen. A semi-crystalline polyester containing end methacryloyl groups is obtained which exhibits the following characteristics:

acid number: 2.0 mg of KOH/g hydroxyl number: 48 mg of KOH/g content of unsaturations: 0.8 meq db/g ICI viscosity at 100° C.: 150 mPa·s melting temperature (DSC; 65° C.

20° C./min):

$\overline{M}n$ (GPC); 2530

EXAMPLE 7

Synthesis of a Semi-crystalline Polyester Containing End Methacryloyl Groups in 2 Stages 1st Stage A mixture of 502.6 parts of 1,4-cyclohexane-dimethanol, of 545.4 parts of adipic acid and of 2.3 parts of n-butyltin trioctoate, as catalyst, is reacted according to the complete procedure described in the first stage of Example 2.

The semi-crystalline polyester containing end carboxyl groups thus obtained exhibits the following characteristics:

acid number: 31 mg of KOH/g hydroxyl number: 2 mg of KOH/g

2nd Stage

The polyester obtained in the 1st stage is allowed to cool to a temperature of 140° C. and 0.4 part of di-tert-butylhydroquinone and 4.6 parts of benzyltriphenylphosphonium chloride are added thereto. 70.3 parts of glycidyl methacrylate are then added slowly to this mixture and the mixture is left stirring for one hour at 140° C. under oxygen. A semi-crystalline polyester containing end methacryloyl groups is obtained which exhibits the following characteristics:

acid number: 1.7 mg of KOH/g hydroxyl number: 30 mg of KOH/g content of unsaturations: 0.5 meq db/g ICI viscosity at 100° C.: 3600 mPa·s melting temperature (DSC; 67° C. 20° C./min):

$\overline{M}n$ (GPC): 4024

EXAMPLE 8

Synthesis of an Acrylic Copolymer Containing Acryloyl Groups, in Two Stages

1st Stage.

376.5 parts of n-butyl acetate are introduced into the same reactor as that described in the 1st stage of Example 3 and are brought to 92° C. with stirring and while purging the solvent with nitrogen. A mixture of 94.12 parts of n-butyl acetate and of 5.95 parts of 2,2'-azobis(2-methylbutanenitrile) is then added to the reactor by means of a peristaltic pump over 215 minutes. 5 minutes after the beginning of the addition of this mixture, the addition is begun to the reaction mixture of a mixture comprising 66.89 parts of glycidyl methacrylate, 179.26 parts of isobornyl acrylate, 45.41 parts of n-butyl methacrylate, 179.02 parts of styrene and 18.82 parts of n-dodecyl mercaptan. The latter mixture is added over a time of 180 minutes. After a total synthesis time of 315 minutes, the reaction mixture is poured into a rotary evaporator and the volatile products are evaporated at 175° C. for 2 hours.

The acrylic copolymer carrying glycidyl groups thus obtained exhibits a content of epoxy groups (E.E.W.) of 0.949 meq/g and an ICI viscosity of 48,000 mPa·s at 125° C.

2nd Stage.

The copolymer obtained in the first stage is placed in the same reactor as that described in Example 3, 2nd stage. The copolymer is heated at 100° C. while continuing to purge it by means of air. After 30 minutes, 0.094 part of Norsocryl 200 is added thereto. After 60 minutes, 33.91 parts of acrylic acid are added over 30 minutes by means of a peristaltic pump. The temperature is kept constant throughout the synthesis and the acid number is determined by titration at regular intervals. The value of this acid number reaches 4.10 mg of KOH/g after 300 minutes, at which point the acrylic copolymer containing acryloyl groups thus obtained is cooled. This copolymer exhibits the following characteristics:

| content of unsaturations | 0.815 meq db/g |
| --- | --- |
| cone/plate viscosity (ICI) at 125° C. | 60,000 mPa.s |
| Tg (DSC, 20° C./min) | 55° C. |
| $\overline{M}n$ (GPC) | 3950 |

EXAMPLE 9

Synthesis of an Acrylic Copolymer Containing Methacryloyl Groups, in Two Stages

1st Stage.

374.02 parts of n-butyl acetate are introduced into the same reactor as that described in the 1st stage of Example 3 and are brought to 92° C. with stirring and while purging the solvent with nitrogen. A mixture of 93.50 parts of n-butyl acetate and of 5.91 parts of 2,2'-azobis(2-methylbutanenitrile) is then added to the reactor by means of a peristaltic pump over 215 minutes. Five minutes after the beginning of the addition of this mixture, the addition is begun to the reaction mixture of a mixture comprising 73.45 parts of β-methylglycidyl methacrylate, 178.03 parts of isobornyl acrylate, 52.22 parts of n-butyl methacrylate, 163.82 parts of styrene and 18.70 parts of n-dodecyl mercaptan. The latter mixture is added over a time of 180 minutes. After a total synthesis time of 315 minutes, the reaction mixture is placed in a rotary evaporator and dried at 175° C. for 2 hours.

The acrylic copolymer carrying β-methylglycidyl groups thus obtained exhibits a content of epoxy groups (E.E.W.) of 0.950 meq/g and an ICI viscosity of 48,000 mPa·s at 125° C.

2nd Stage.

The copolymer obtained in the first stage is placed in the same reactor as that described in Example 3, 2nd stage. The copolymer is heated at 130° C. while continuing to purge it by means of air. After 30 minutes, 0.093 part of Norsocryl 200 is added thereto. After 60 minutes, 40.24 parts of methacrylic acid are added over 30 minutes by means of a peristaltic pump. The temperature is kept constant throughout the synthesis and the acid number is determined by titration at regular intervals. The value of this acid number reaches 7.30 mg of KOH/g after 300 minutes, at which point the acrylic copolymer containing methacryloyl groups thus obtained is cooled.

This copolymer exhibits the following characteristics:

| content of unsaturations | 0.747 meq db/g |
| --- | --- |
| cone/plate viscosity (ICI) at 125° C. | 20,000 mPa.s |
| Tg (DSC, 20° C./min) | 45° C. |
| $\overline{M}n$ (GPC) | 3665 |

EXAMPLE 10

Synthesis of an Acrylic Copolymer Containing Methacryloyl Groups, in Two Stages

1st Stage.

370.3 parts of xylene are introduced into the same reactor as that described in the 1st stage of Example 3 and are brought to 142° C. with stirring and while purging the solvent with nitrogen. A mixture of 92.58 parts of xylene and of 13.89 parts of tert-butyl peroxybenzoate is then added to the reactor by means of a peristaltic pump over 215 minutes. Five minutes after the beginning of the addition of this mixture, the addition is begun to the reaction mixture of a mixture comprising 93.18 parts of 1-(1-isocyanato-1-methylethyl)-3-(1-methylethenyl)benzene (TMI), 203.7 parts of isobornyl acrylate, 64.20 parts of n-butyl methacrylate and 101.83 parts of styrene. The latter mixture is added over a time of 180 minutes and the total time for the synthesis is 315 minutes.

The acrylic copolymer carrying isocyanato groups thus obtained exhibits a content of isocyanato groups of 0.971 meq/g and an ICI viscosity of 44,500 mPa·s at 125° C.

2nd Stage.

The reaction mixture obtained in the 1st stage is placed in the same reactor as that described in Example 3, 2nd stage. It is heated at 70° C. while continuing to purge it by means of air. After 30 minutes, 0.0925 part of Norsocryl 200 is added thereto. After 60 minutes, 60.22 parts of hydroxyethyl methacrylate are added over 120 minutes by means of a peristaltic pump. The temperature is kept constant throughout the synthesis and the content of isocyanato groups is determined by back titration by means of dibutylamine and of 0.1N hydrochloric acid in dimethylformamide, at regular intervals. The content of isocyanato groups reaches a value of less than 0.01 meq/g 120 minutes after the end of the addition of hydroxyethyl methacrylate, at which point the acrylic copolymer containing methacryloyl groups thus obtained is cooled. The reaction mixture is placed in a rotary evaporator and dried at 150° C. for 2 hours.

This copolymer exhibits the following characteristics:

| content of unsaturations | 0.862 meq db/g |
|---|---|
| cone/plate viscosity (ICI) at 125° C. | 35,000 mPa.s |
| Tg (DSC, 20° C./min) | 84° C |
| $\overline{M}n$ (GPC) | 4300 |

EXAMPLE 11

Synthesis of an Acrylic Copolymer Containing Ethylenic Groups, Prepared in Two Stages 1st Stage.

347.95 parts of ethyl acetate are introduced into the same reactor as that described in the 1st stage of Example 3 and are brought to 78° C. with stirring and while purging the solvent with nitrogen. A mixture of 86.99 parts of ethyl acetate and of 5.50 parts of 2,2'-azobis(2-methylpropanenitrile) is then added to the reactor by means of a peristaltic pump over 215 minutes. Five minutes after the beginning of the addition of this mixture, the addition is begun to the reaction mixture of a mixture comprising 56.58 parts of hydroxyethyl methacrylate, 260.96 parts of methyl methacrylate, 117.37 parts of n-butyl methacrylate and 26.09 parts of n-dodecyl mercaptan. The latter mixture is added over a time of 180 minutes. After a total synthesis time of 315 minutes, the reaction mixture is cooled and kept at 70° C. for 16 hours.

The acrylic copolymer carrying hydroxyl groups thus obtained exhibits a hydroxyl number of 52.0 mg of KOH/g and an ICI viscosity of 8000 mPa·s at 175° C.

2nd Stage. 4.66 parts of tert-butylhydroquinone and, after a half-hour, 1.73 parts of dibutyltin dilaurate are added to the reaction mixture of the 1st stage. A mixture of 87.46 parts of 1-(1-isocyanato-1-methylethyl)-3-(1-methylethenyl) benzene (TMI) and 4.66 parts of tert-butylhydroquinone, in a 1/1 stoichiometric ratio with respect to the number of hydroxyl equivalents of the copolymer obtained in the 1st stage, is then added to the reaction mixture over a period of 2 hours. A sample of the reaction mixture is withdrawn just after the end of the addition of the TMI and then at each interval of 1 hour. The content of isocyanato groups in these samples is determined by back titration by means of dibutylamine and of 0.1N hydrochloric acid in dimethylformamide, at regular intervals. Two hours after the end of the addition of the TMI, it is no longer possible to detect isocyanato groups.

The reaction mixture is placed in a rotary evaporator and dried at 150° C. for 2 hours.

The acrylic copolymer carrying ethylenic groups (introduced by the 1-methylethenyl radical of the TMI) thus obtained exhibits the following characteristics:

| content of unsaturations | 0.769 meq db/g |
|---|---|
| cone/plate viscosity (ICI) at 150° C. | 8400 mPa.s |
| Tg (DSC, 20° C./min) | 55° C. |
| $\overline{M}n$ (GPC) | 2500 |

EXAMPLE 12

Synthesis of an Acrylic Copolymer Containing Ethylenic Groups, in Two Stages

1st Stage.

377.5 parts of n-butyl acetate are introduced into the same reactor as that described in the 1st stage of Example 3 and are brought to 92° C. with stirring and while purging the solvent with nitrogen. A mixture of 94.4 parts of n-butyl acetate and of 5.97 parts of 2,2'-azobis(2-methylbutanenitrile) is then added to the reactor by means of a peristaltic pump over 215 minutes. Five minutes after the beginning of the addition of this mixture, the addition is begun to the reaction mixture of a mixture comprising 60.4 parts of hydroxyethyl methacrylate, 221.4 parts of methyl methacrylate, 142.6 parts of n-butyl methacrylate, 47.21 parts of styrene and 4.72 parts of n-dodecyl mercaptan. The latter mixture is added over a time of 180 minutes and the total time for the synthesis is 315 minutes.

A dried sample of the acrylic copolymer carrying hydroxyl groups thus obtained exhibits an $\overline{M}n$ of 5600 and an ICI viscosity of 47,000 mPa·s at 150° C. 2nd stage.

The reaction mixture obtained in the first stage is placed in the same reactor as that described in Example 3, 2nd stage. It is heated to 125° C. while continuing to purge it by means of air. 45.5 parts of maleic anhydride, preheated to 90° C., are then added over 120 minutes by means of a piston pump. The temperature is kept constant throughout the synthesis. The acid number is determined by titration at regular intervals. When the value of this acid number reaches 22 mg of KOH/g, the reaction mixture is cooled and is placed in a rotary evaporator, where it is dried at 150° C. for 2 hours.

The acrylic copolymer carrying ethylenic groups (introduced by the ethylenic unsaturation of the maleic anhydride) thus obtained exhibits the following characteristics:

| content of unsaturations | 0.878 meq db/g |
|---|---|
| cone/plate viscosity (ICI) at 150° C. | 36,000 mPa.s |
| Tg (DSC, 20° C./min) | 47.5° C. |
| $\overline{M}n$ (GPC) | 5880 |

EXAMPLE 13

Preparation of Powder Coating Compositions, Stability of These Compositions and Properties of the Coatings Obtained After Radiation Curing.

Three series of powders of different formulation A, B and C are prepared from the semi-crystalline polyesters containing end methacryloyl groups and from the acrylic copolymers containing ethylenically unsaturated groups obtained in Examples 1 to 12. In these formulations, the parts by weight of the combined polyesters and acrylic copolymers employed are reported. The number of the synthesis example and the proportion of each polyester and acrylic copolymer employed, with respect to the combined polyesters and acrylic copolymers, are indicated in Table II:

| | | |
|---|---|---|
| A) | Semi-crystalline polyester and/or acrylic copolymer | 96.65 parts |
| | Photoinitiator (Irgacure 1800 from the company Ciba-Geigy) | 2.50 parts |
| | Fluidity-regulating agent (Byk 356) | 0.5 part |
| | Degassing agent (Benzoin) | 0.35 part |
| B) | Semi-crystalline polyester and acrylic copolymer | 69.40 parts |
| | Titanium dioxide (Kronos CL 2310) | 29.75 parts |
| | Fluidity-regulating agent (Byk 356) | 0.5 part |
| | Degassing agent (Benzoin) | 0.35 part |
| C) | Semi-crystalline polyester and/or acrylic copolymer | 72.49 parts |
| | Photoinitiator (mixture of Irgacure 2959 and of Irgacure 819, Ciba-Geigy, in a ratio by weight of 1/1) | 2.50 parts |
| | Titanium dioxide (Kronos CL 2310) | 24.16 parts |
| | Fluidity-regulating agent (Byk 356) | 0.5 part |
| | Degassing agent (Benzoin) | 0.35 part |

These powder compositions are prepared by dry mixing the polyesters and the acrylic copolymers and, for the formulations A and C., the photoinitiators with the various additional substances conventionally used for the manufacture of powder paints and varnishes. The mixture obtained is homogenized at a temperature of 80 to 100° C., in a 16 mm Prism twin-screw extruder, with L/D=15/1, and the extrudate is cooled and ground in a Retsch ZM 100 grinder, with a mesh size of 0.5 mm. To complete, the powder is sieved in order to obtain a size of the particles of between 20 and 100 micrometres.

A portion of the powders is subjected to the stability test. In order to carry out this test,. 25 g of powder are placed in a 100 ml container. The container is placed in a water bath, so that it is immersed in the water up to ¾ of its height.

The test begins on day No. 1, the water in the bath being placed at 38° C. The agglomeration of the powder is evaluated after 24 hours and for 5 consecutive days, the temperature being increased according to Table I.

TABLE I

| | T° C. | Evaluation |
|---|---|---|
| day 1 | 38 | day 2 |
| day 2 | 40 | day 3 |
| day 3 | 42 | day 4 |
| day 4 | 45 | day 5 |

A grading of between 5 (excellent) and 0 (very bad) is given to the powders each day, according to the following scale:

5: excellent, the powder is fluid and problem-free;
4: good, the powder is fluid with a slight movement of the hand;
3: acceptable, the powder is fluid with a movement of the hand but a few small agglomerates are present;
2: bad, the powder can only be fluidized with problems, many agglomerates being present;
0: very bad, the powder cannot be fluidized.

On the last day of the test period, a grading with respect to the agglomeration of the powder is given:

++: no agglomerates are present;
+: a few small agglomerates are present, which can be reduced to powder by a slight pressure;
+−: larger agglomerates are present, which can be reduced to powder by a slight pressure;
−: fairly hard agglomerates;
−−: hard agglomerates;
−−−: a lump has formed.

The results are listed in Table II.

Another portion of the powders formulated as described above is applied by means of an electrostatic spray gun at a voltage of 70 kV to untreated cold-rolled steel panels at a film thickness of 50 to 70 micrometres.

The coatings of formulation A and C deposited are then subjected to melting by means of medium-wavelength infrared radiation (Hereaus carbon IR emitter, with an irradiation density of 80 kW/m$^2$) at a temperature of 130° C. for a time of approximately 4 minutes. The coatings in the molten state obtained with the powders are then subjected to irradiation with the ultraviolet light emitted by 100 W/cm medium-pressure mercury vapour UV lamps (DQ 1023 from the company Heraeus Instruments GmbH), at a distance of 15 cm and for a time of 2 seconds.

The coatings of formulation B are melted by IR in the same way as the coatings of formulation A but at a temperature of 200° C. for 30 seconds, followed by 3 minutes at 120° C. The coatings are then subjected, under a nitrogen atmosphere, to a beam of accelerated electrons produced by a 170 KeV linear cathode (from the company Energy Sciences Inc.).

The cured coatings thus obtained are subjected to conventional tests. The results obtained are reported in Table II, in which the first column identifies the composition tested;
the second column the type of formulation used;
the third column the number of the example of the synthesis of the semi-crystalline polyester carrying end methacryloyl groups and its amount as % by weight with respect to the combined weight of the polyester and of the acrylic copolymer;
the fourth column the number of the example of the synthesis of the acrylic copolymer carrying ethylenically unsaturated groups and its amount as % by weight with respect to the combined weight of the polyester and of the acrylic copolymer;
the fifth column the value of the resistance to direct impact, in kg·cm, according to ASTM standard D2795;
the sixth column the value of the resistance to reverse impact, in kg·cm, according to ASTM standard D2795;
the seventh column the value of the pencil hardness at an angle of 45° C., with a force of 7.5 newtons, measured according to ASTM standard D3363-92A;
the eighth column the resistance to methyl ethyl ketone, which corresponds to the number of twofold rubbing movements (to and fro) with a cotton wool pad impregnated with methyl ethyl ketone which does not detrimentally affect the appearance of the surface of the cured film;
the ninth column a visual assessment of the coating, according to which "good" means that the cured coating possesses a smooth and glossy appearance, without apparent defects such as craters, pinholes and the like, "medium" means that the cured coating exhibits an orange peel appearance with a gloss, measured at an angle of 60°, which is less than 80% and surface defects; and
the tenth column the stability on storage, evaluated as explained above.

These results clearly show that the powder compositions in accordance with the invention based on a mixture of a semi-crystalline polyester containing end methacryloyl groups and of an acrylic copolymer containing ethylenically unsaturated groups give paint and varnish coatings which possess excellent characteristics.

In fact, comparison of the properties of the coatings obtained with the compositions according to the invention (a) to (d), (g), (i) to (k), (m) and (n) with those of the coatings obtained with the comparative compositions (e), (f), (h), (l) and (o), which do not contain semi-crystalline polyesters carrying methacryloyl groups, shows that:

the flexibility (direct and reverse impact) is much better for the compositions according to the invention;

the surface appearance is also much better for the compositions according to the invention;

it is the same for the resistance to solvents.

As regards the surface hardness, it is very high, ranging up to 3H, both for the compositions according to the invention and for the comparative compositions.

All these properties are obtained at melting temperatures as low as 120–130° C.

Moreover, the compositions in accordance with the invention are stable on storage.

TABLE II

| Composition | Formulation | Semi-crystalline polyester: No. of the example and amount | Acrylic copolymer: No. of the example and amount | Resistance, direct impact | Resistance, reverse impact | Pencil hardness | MEK rubs | Visual assessment | Stability on storage |
|---|---|---|---|---|---|---|---|---|---|
| (a) | A | Example 2 20 | Example 3 80 | 40 | 20 | 3H | >100 | good | 5, 4, 4, 4+ |
| (b) | A | Example 5 31.4 | Example 5 68.6 | 40 | 40 | H | >150 | good | 5, 5, 5, 4++ |
| (c) | A | Example 2 15 | Example 4 85 | 40 | 40 | 3H | >100 | good | 5, 4, 3, 3+ |
| (d) | B | Example 2 20 | Example 3 80 | 20 | 20 | 2H | >100 | good | 5, 5, 4, 4,+ |
| (e) | A | - | Example 3 100 | 0 | 0 | 2H | 50 | medium | 5, 5, 4, 3+ |
| (f) | C | - | Example 8 100 | 0 | 0 | 2H | 40 | medium | 5, 5, 4, 3+ |
| (g) | C | Example 7 30 | Example 8 70 | 40 | 40 | 2H | >100 | good | 5, 4, 4, 3+ |
| (h) | C | - | Example 9 100 | 0 | 0 | 2H | 50 | medium | 5, 4, 4, 3+ |
| (i) | C | Example 6 15 | Example 9 85 | 20 | 40 | 3H | >100 | good | 4, 4, 3, 3+ |
| (j) | A | Example 7 30 | Example 10 70 | 40 | 40 | 3H | >100 | good | 5, 4, 3, 3+ |
| (k) | C | Example 7 30 | Example 10 70 | 20 | 40 | 2H | >100 | good | 5, 4, 3, 3+ |
| (l) | A | - | Example 11 100 | 0 | 0 | H | 40 | medium | 5, 4, 4, 3+ |
| (m) | A | Example 2 25 | Example 11 75 | 40 | 40 | 2H | >100 | good | 5, 4, 4, 3+ |
| (n) | A | Example 2 20 | Example 12 80 | 40 | 40 | 3H | >100 | good | 4, 4, 3, 3+ |
| (o)* | A | - | Example 12 100 | 0 | 0 | 2H | 20 | medium | 5, 4, 4, 3+ |

*The compositions (e), (f), (h), (l) and (o), indicated by *, are tested by way of comparison.

I claim:

1. A radiation-curable powder composition comprising:
a mixture of at least one semi-crystalline polyester containing end methacryloyl groups having a degree of end unsaturation of 0.17 to 2.0 milliequivalent of double bonds per gram of polyester, and
at least one acrylic copolymer containing ethylenically unsaturated groups,
wherein said semi-crystalline polyesters containing end methacryloyl groups comprise the reaction products of a glycidyl methacrylate and a semi-crystalline polyester containing end carboxyl groups, the semi-crystalline polyester containing end carboxyl groups representing
(a) a polyester which is the reaction product of
(1) an acid constituent which contains
85 to 100 mol % of terephthalic acid; 1,4-cyclohexanedicarboxylic acid; or 1,12-dodecanedioic acid; and
0 to 15 mol % of at least one first aliphatic, cycloaliphatic or aromatic di- or polycarboxylic acid having from 4 to 14 carbon atoms; and
(2) an alcohol constituent which contains
85 to 100 mol % of a saturated, straight-chain, aliphatic diol having from 2 to 12 carbon atoms; and
0 to 15 mol % of at least one aliphatic or cycloaliphatic di- or polyol having from 2 to 15 carbon atoms; or
(b) a polyester which is the reaction product of
(1) an acid constituent which contains
85 to 100 mol % of a saturated, straight-chain, aliphatic dicarboxylic acid having from 4 to 14 carbon atoms; and
0 to 15 mol % of at least one second aliphatic, cycloaliphatic or aromatic di- or polycarboxylic acid having from 4 to 14 carbon atoms; and
(2) and alcohol constituent which contains
85 to 100 mol % of 1,4-cyclohexanediol, or 1,4-cyclohexanedimethanol, and
0 to 15 mol % of at least one second aliphatic or cycloaliphatic di- or polyol having from 2 to 15 carbon atoms;

and wherein said acrylic copolymer containing ethylenically unsaturated groups represents (c) a reaction product of
(1) an acrylic copolymer carrying functional groups containing
40 to 95 mol % of at least one monomer containing the acryloyl or methacryloyl group;
5 to 60 mol % of at least one first ethylenically unsaturated monomer; and
5 to 60 mol %, calculated with respect to the total of the amounts of said acryloyl or methacryloyl monomer and said first ethylenically unsaturated monomer, of a second ethylenically unsaturated monomer carrying a functional group capable of undergoing an addition or condensation reaction and representing the epoxy, carboxyl, hydroxyl or isocyanate groups, with
(2) a monomer containing
an ethylenically unsaturated group and a functional group capable of undergoing an addition or condensation reaction with the functional group of said second ethylencially unsaturated monomer incorporated in said acrylic copolymer.

2. A composition according to claim 1, wherein the ethylenically unsaturated groups of the acrylic copolymer represent acryloyl or methacryloyl groups, and wherein the ethylenically unsaturated group of the monomer (c.2) is an acryloyl or methacryloyl group.

3. A composition according to claim 1, wherein said first di- or polycarboxylic acid represents maleic acid, fumaric acid, isophthalic acid, phthalic acid, terephthalic acid, 1,2-cyclohexanedicarboxylic acid, 1,3-cyclohexanedicarboxylic acid, 1,4-cyclohexandedicarboxylic acid, succinic acid, glutaric acid, adipic acid, pimelic acid, suberic acid, azelaic acid, sebacic acid, trimellitic acid, pyromellitic acid or their anhydrides, alone or as a mixture.

4. A composition according to claim 1, wherein said saturated, straight-chain, aliphatic diol represents ethylene glycol, 1,4-butanediol, 1,5-pentanediol or 1,6-hexanediol.

5. A composition according to claim 1, wherein said aliphatic or cycloaliphatic di- or polyol represents hydrogenated bisphenol A, trimethylolpropane, ditrimethylolpropane, trimethylolethane, pentaerythritol or their mixtures.

6. A composition according to claim 1, wherein said saturated, straight-chain, aliphatic dicarboxylic acid represents succinic acid, glutaric acid, adipic acid, pimelic acid, suberic acid, azelaic acid, sebacic acid, 1,12-dodecanedioic acid or their anhydrides, alone or as a mixture.

7. A composition according to claim 1, wherein said second aliphatic cycloaliphatic or aromatic di- or polycarboxylic acid represents maleic acid, fumaric acid, phthalic acid, terephthalic acid, isophthalic acid, 1,2-cyclohexanedicarboxylic acid, 1,3-cyclohexanedicarboxylic acid, 1,4-cyclohexanedicarboxylic acid, trimellitic acid, pyromellitic acid or their anhydrides, alone or as a mixture.

8. A composition according to claim 1, wherein said second aliphatic or cycloaliphatic di- or polyol represents ethylene glycol, propylene glycol, 1,4-butanediol, 1,5-pentanediol, 1,6-hexanediol, 1,4-cyclohexanediol, 1,4-cyclohexanedimethanol, hydrogenated bisphenol A, trimethylolpropane, ditrimethylolpropane, trimethylolethane, pentaerythritol or their mixtures.

9. A composition according to claim 1, wherein said semi-crystalline polyester containing end methacryloyl groups has a number-average molecular weight of 1000 to 20,000.

10. A composition according to claim 1, wherein said semi-crystalline polyester containing end methacryloyl groups exhibits a melting temperature of 60 to 150° C.

11. A composition according to claim 1, wherein the glycidyl methacrylate represents glycidyl methacrylate or β-methylglycidyl methacrylate.

12. A composition according to claim 1, wherein said monomer containing the acryloyl or methacryloyl group represents the monomers methyl, ethyl, propyl, n-butyl, isobutyl, tert-butyl, 2-ethylhexyl, stearyl, tridecyl, cyclohexyl, benzyl, phenyl, diethylaminoethyl, dimethylaminoethyl, isobornyl, polysiloxane or caprolactone acrylate or methacrylate, alone or as a mixture.

13. A composition according to claim 1, wherein said first ethylenically unsaturated monomer, other than said monomer containing the acryloyl or methacryloyl group, represents styrene, α-methylstyrene, vinyltoluene, acrylonitrile, methacrylonitrile, vinyl acetate or propionate, acrylamide, methacrylamide, methylolmethacrylamide, vinyl chloride, ethylene, propylene, or olefin having from 4 to 20 carbon atoms, alone or as a mixture.

14. A composition according to claim 1, wherein said second ethylenically unsaturated monomer, other than said monomers containing the acryloyl or methacryloyl group and said first ethylenically unsaturated monomers, carrying a functional group capable of undergoing an addition or condensation reaction and representing the epoxy, carboxyl, hydroxyl or isocyanate groups, is glycidyl acrylate or methacrylate, acrylic or methacrylic acid, hydroxyethyl acrylate or methacrylate, 2-isocyanatoethyl methacrylate, methacryloyl isocyanate, 1-(1-isocyanate-1-methylethyl)-3-(1-methylethenyl) benzene, maleic an hydride or tetrahydrophthalic anhydride.

15. A composition according to claim 1, wherein said monomer which contains both an ethylenically unsaturated group and a functional group capable of undergoing an addition or condensation reaction with the functional group of the acrylic copolymer introduced by said second ethylenically unsaturated monomer represents a monomer which contains an acryloyl or methacryloyl group.

16. A composition according to claim 1, wherein said acrylic copolymer containing ethylenically unsaturated groups exhibits a degree of unsaturation of 0.35 to 3.5 milliequivalent of double bonds per gram of the copolymer.

17. A composition according to claim 1, wherein said acrylic copolymer containing ethylenically unsaturated groups exhibits a viscosity ranging from 10,000 to 100,000 mPa·s at 125° C.

18. A composition according to claim 1, wherein said acrylic copolymer containing ethylenically unsaturated groups has a number-average molecular weight of 1000 to 8000.

19. A composition according to claim 1, wherein said acrylic copolymer containing ethylenically unsaturated groups exhibits a glass transition temperature ranging from 45 to 100° C.

20. A composition according to claim 1, wherein the mixture of the polyester and acrylic copolymer contains 5 to 50 parts by weight of the semi-crystalline polyester containing end methacryloyl groups and 50 to 95 parts by weight of the acrylic copolymer containing ethylenically unsaturated groups, with respect to the total weight of these two constituents.

21. A composition according to claim 1, which does not contain crosslinking agents and catalysts.

22. A composition according to claim 1, which additionally comprises an ethylenically unsaturated oligomer.

23. A composition according to claim 22, which comprises per 100 parts by weight, up to 20 parts by weight of the ethylenically unsaturated oligomer.

24. A composition curable by ultraviolet irradiation according to claim 1, further comprising a photoinitiator.

25. A composition according to claim 24, which comprises, per 100 parts by weight, up to 15 parts by weight of said photoinitiator.

26. A powder varnish or paint curable by irradiation with an accelerated electron beam comprising a composition according to claim 1.

27. A powder varnish or paint curable by ultraviolet irradiation comprising a composition according to claim 1.

28. An article coated entirely or partially with a varnish or paint according to claim 26 comprising, a substrate having thereon the paint or varnish wherein said paint or varnish is cured by an accelerated electron beam.

29. An article coated entirely or partially with a varnish and/or paint according to claim 27, comprising:
a substrate having thereon the paint or varnish wherein said paint or varnish is cured by ultraviolet radiation.

30. A process for coating an article comprising:
depositing on a substrate a composition according to claim 1,
heating said coating to a temperature of 100° C. for 1 to 5 minutes; and
exposing said coating in a molten state to ultra violet radiation or accelerated electron beams for a time sufficient to cure said coating.

31. The process according to claim 30, wherein said deposition is by spraying with a triboelectric or electrostatic gun or by deposition from a fluidized bed.

32. A composition according to claim 9, wherein the degree of end saturation is 0.35 to 1.5 milliequivalent of double bonds per gram of polyester.

33. A composition according to claim 9, wherein the number average molecular weight is 1400 to 8500.

34. A composition according to claim 16, wherein the degree of unsaturation is 0.5 to 2.5 milliequivalents of double bonds per gram of the copolymer.

35. A composition according to claim 18, wherein the number average molecular weight is 2000 to 6000.

36. A composition according to claim 20, wherein the mixture of the polyester and acrylic copolymer contains 5 to 35 parts by weight of the semi-crystalline polyester containing end methacryloyl groups; and 65 to 95 parts by weight of the acrylic copolymer containing ethylenically unsaturated groups, with respect to the total weight of these two constituents.

37. A composition according to claim 23, which comprises, per 100 parts by weight, up to 10 parts by weight of the ethylenically unsaturated oligomer.

38. A composition according to claim 24, further comprising a photoactivator.

* * * * *